United States Patent
Powell

(10) Patent No.: US 9,175,647 B2
(45) Date of Patent: Nov. 3, 2015

(54) HOT OIL THERMAL BATTERY

(75) Inventor: Patrick Powell, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 842 days.

(21) Appl. No.: 13/471,554

(22) Filed: May 15, 2012

(65) Prior Publication Data

US 2012/0312279 A1 Dec. 13, 2012

Related U.S. Application Data

(60) Provisional application No. 61/496,168, filed on Jun. 13, 2011.

(51) Int. Cl.
*F02G 5/00* (2006.01)
*F02M 31/16* (2006.01)
*F28D 20/02* (2006.01)
*F02M 31/10* (2006.01)
F28D 20/00 (2006.01)
F28D 21/00 (2006.01)

(52) U.S. Cl.
CPC .............. *F02M 31/16* (2013.01); *F02M 31/10* (2013.01); *F28D 20/025* (2013.01); *F28D 20/028* (2013.01); *F28D 2020/0069* (2013.01); *F28D 2021/008* (2013.01); *Y02E 60/145* (2013.01); *Y02T 10/126* (2013.01)

(58) Field of Classification Search
CPC ....... F02M 31/10; F02M 31/16; F02M 53/00; F02M 55/025; F02M 63/0275; F02M 69/465; F02M 53/06; F02M 27/04; F01P 2060/10; F28D 20/025; F28D 20/028; F28D 2020/0069

USPC ......... 123/536, 545–547, 549, 553, 557, 514, 123/456, 509

See application file for complete search history.

(56) References Cited

U.S. PATENT DOCUMENTS

| | | | | |
|---|---|---|---|---|
| 4,454,851 A | * | 6/1984 | Bourbonnaud et al. | 123/557 |
| 4,505,124 A | | 3/1985 | Mayer | 62/180 |
| 4,811,719 A | * | 3/1989 | Baumann | 123/557 |
| 4,858,584 A | * | 8/1989 | Bridgeman | 123/557 |
| 5,443,053 A | * | 8/1995 | Johnson | 123/557 |
| 5,611,392 A | * | 3/1997 | Malecek et al. | 165/47 |
| 6,133,546 A | | 10/2000 | Bains | 219/202 |
| 7,467,605 B2 | * | 12/2008 | Szalony et al. | 123/41.04 |
| 7,669,585 B2 | * | 3/2010 | Haag et al. | 123/456 |
| 8,069,845 B2 | * | 12/2011 | Ulrey et al. | 123/553 |
| 8,151,771 B2 | * | 4/2012 | Pursifull et al. | 123/557 |
| 8,733,324 B2 | * | 5/2014 | Blizard et al. | 123/468 |
| 2001/0027757 A1 | * | 10/2001 | Katayama | 123/41.29 |
| 2006/0027216 A1 | * | 2/2006 | Hayashi et al. | 123/527 |
| 2009/0229580 A1 | * | 9/2009 | Kopinsky | 123/519 |
| 2010/0299052 A1 | * | 11/2010 | Sturman | 701/113 |
| 2011/0030929 A1 | * | 2/2011 | Powell | 165/121 |
| 2011/0203947 A1 | * | 8/2011 | Ogawa | F02M 25/089 206/216 |
| 2011/0259285 A1 | * | 10/2011 | Michikawauchi et al. | 123/3 |
| 2012/0186560 A1 | * | 7/2012 | Lund | 123/495 |
| 2012/0241120 A1 | * | 9/2012 | Hagel et al. | 165/10 |

* cited by examiner

*Primary Examiner* — Hai Huynh

(74) *Attorney, Agent, or Firm* — Harness, Dickey & Pierce, P.L.C.

(57) ABSTRACT

A fluid temperature conditioner heats fuel being supplied to a fuel injection system for an engine. During operation of the engine, energy is transferred from engine and stored in a thermal battery which is a part of the fluid temperature conditioner. During cold starting of the engine, the energy is transferred from the thermal battery to the fuel to aid in the starting of the engine.

5 Claims, 5 Drawing Sheets

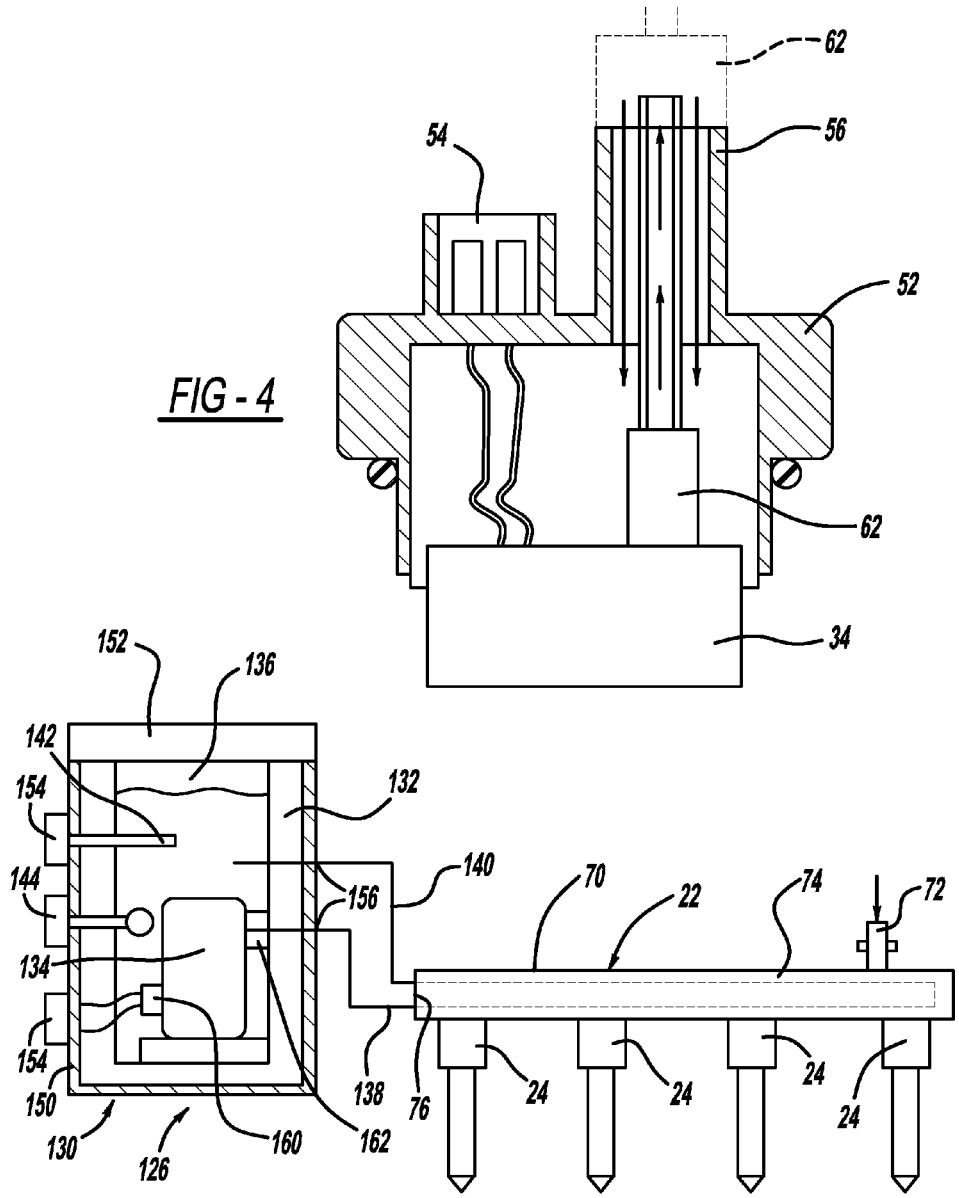

HOT OIL THERMAL BATTERY

CROSS-REFERENCE TO RELATED APPLICATIONS

This application claims the benefit and priority of 61/496,168, filed Jun. 13, 2011. The entire disclosure of the above application is incorporated herein by reference.

FIELD

The present disclosure is directed to a fuel injection system for an automotive vehicle. More particularly, the present disclosure is directed to a system that heats the fuel being supplied to the engine of the automotive vehicle.

BACKGROUND

This section provides background information related to the present disclosure which is not necessarily prior art.

Due to a demand for clean waste gas and in view of concern about the oil supply and oil costs in recent years, diesel fuels and gasoline-alcohol mixed fuels are becoming more popular. Ethanol (ethyl alcohol) fuel mixtures have "E" numbers which describe the percentage of ethanol in the mixture by volume. For example, E85 is 85% anhydrous ethanol and 15% gasoline. Fuel mixtures having less than 10% ethanol (E0-E10) typically do not require any modifications to modern day vehicles. Fuel mixtures of E10 to E25 may require modifications to the fuel system, but not the basic engine. Fuel mixtures of E25 to E85 may require modification to the fuel system and to the basic engine. Fuel mixtures of E85 to E100 (100% ethanol) may require modifications to the fuel system, modifications to the basic engine and may require some type of cold starting system.

The high alcohol containing fuel, such as E100 which is used in Brazil, has inherent problems such as the low theoretical air-fuel cost as compared with gasoline because the combustion of alcohol is a chemical equivalent combustion and an increase in the latent heat of evaporation of alcohol. Due to an increase in the amount of fuel injected and an increase in heat necessary for evaporation, failure of engine start at low ambient temperature becomes a problem.

One solution to this engine start problem at low ambient temperatures is to equip the vehicle with a second fuel tank typically located next to the engine. The fuel tank is filled with gasoline, not ethanol and the fuel in this tank is used to help start the vehicle under extreme conditions such as cold weather. Should a person forget to fill this second tank, the vehicle may not start. Eliminating this second tank improves safety, provides packaging space under the hood for additional components and potentially reduces overall vehicle costs.

Another solution to this engine start problem at low ambient temperatures is to equip the vehicle with an electric heater that heats up the fuel in a heated fuel injection rail. This system is high cost and it uses a significant amount of electrical power which then requires a larger, heavier and more costly battery.

SUMMARY

This section provides a general summary of the disclosure, and is not a comprehensive disclosure of its full scope or all of its features.

The present disclosure provides the art with a system that heats the fuel prior to the fuel being injected into the combustion chamber to resolve the engine start problem at low temperature. The system utilizes a phase change material or an other thermal storing system which collects heat generated by the vehicle's engine during operation of the engine. The collected heat is stored in the phase change material or in the other thermal storing system for a specified time period and this heat is made available to the fuel system to heat the fuel prior to it being injected into the vehicle's engine.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an enlarged schematic view of the oil pump illustrated in FIG. 2;

FIG. 5 is a schematic view of a hot oil temperature conditioner in accordance with another embodiment of the present disclosure;

Corresponding reference numerals indicate corresponding parts throughout the several views of the drawings.

DETAILED DESCRIPTION

Example embodiments will now be described more fully with reference to the accompanying drawings.

Figure 1:
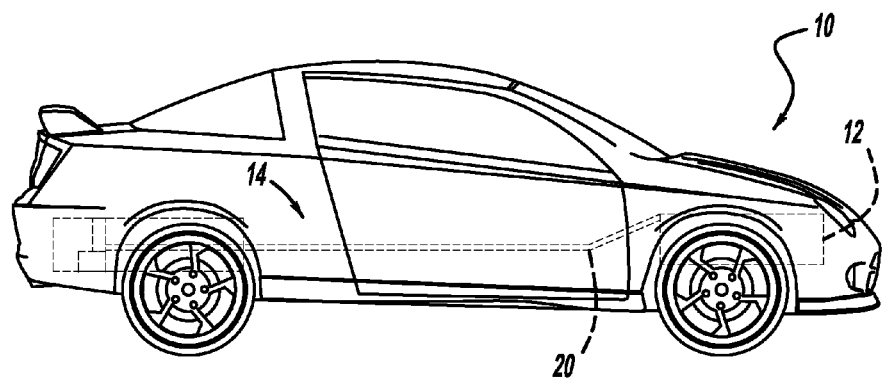
FIG. 1 is a schematic view of a vehicle incorporating the fuel injection system in accordance with the present disclosure.
Figure 2:
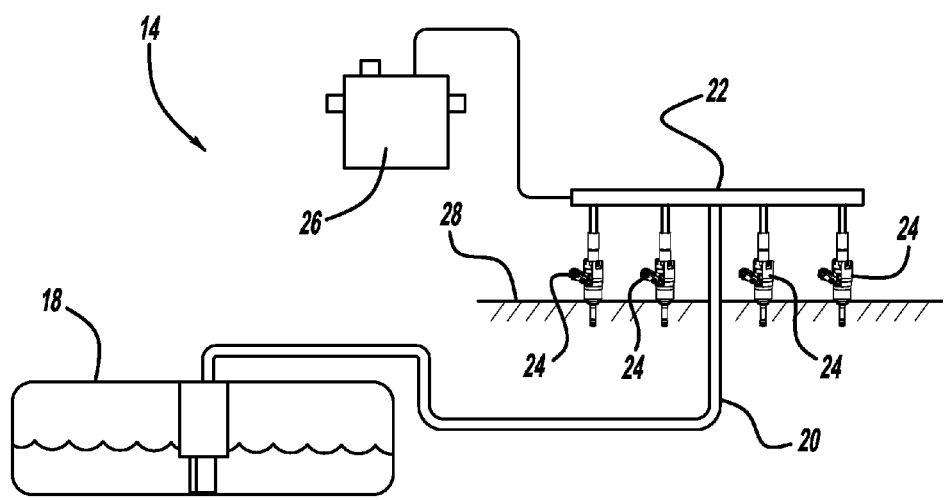
FIG. 2 is a schematic view of the fuel injection system in accordance with the present disclosure.

Referring now to FIGS. 1 and 2, vehicle 10 is illustrated which includes an internal combustion engine 12 that receives fuel from a fuel injection system 14. Fuel injection system 14 comprises a fuel tank 18, a fuel supply line 20, a fuel injector rail or housing 22, a plurality of fuel injectors 24 connected to fuel injector rail 22 and a hot fluid temperature conditioner 26. Fuel supply line 20 carries fuel from fuel tank 18 to fuel injector rail 22. During operation of engine 12, fuel passes from fuel injector rail 22 into fuel injector 24 and is subsequently sprayed into engine 12 through an intake manifold or a cylinder head 28 and into a combustion cylinder for combustion. Hot fluid temperature conditioner 26 is utilized during cold temperature situations to heat the fuel prior to when the fuel is injected into internal combustion engine 12. While fuel injection system 14 is illustrated as being associated with vehicle 10, it is within the scope of the present disclosure to utilize fuel injection system 14 with any type of vehicle which utilizes an internal combustion engine.

Figure 3:
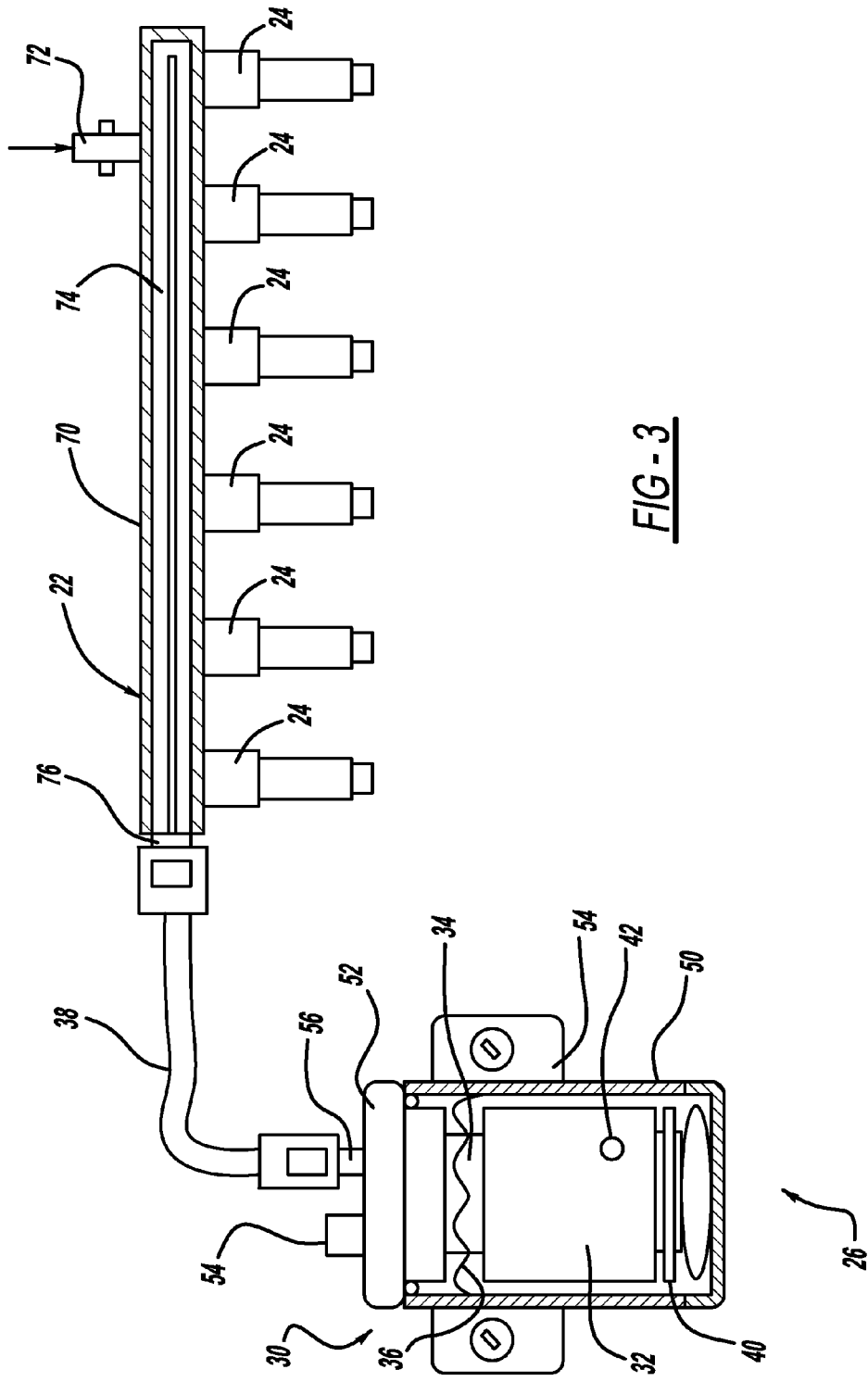
FIG. 3 is a schematic view of a hot fluid temperature conditioner in accordance with the present disclosure.

Referring now to FIGS. 3 and 4, hot fluid temperature conditioner 26 is illustrated in greater detail. Hot fluid temperature conditioner 26 comprises a reservoir 30, a thermal medium in the form of a phase change material 32, a fluid pump 34, a first heat transfer medium 36, a co-axial feed and return tube 38, an electric resistance heater 40 and a temperature sensor 42. While co-axial feed and return tube 38 is illustrated, it is within the scope of the present disclosure to use separate feed and return tubes.

Reservoir 30 comprises a reservoir tank 50 and a cover 52. Reservoir tank 50 is a metal or plastic tank having insulated walls. Cover 52 includes an electric terminal 54 for providing power to fluid pump 34 and electric resistance heater 40 and a fluid port 56 which mates with co-axial feed and return tube 38. Phase change material 32, fluid pump 34 and first heat transfer medium 36 are disposed within reservoir tank 50 of reservoir 30. Co-axial feed and return tube 38 extends between cover 52 of reservoir 30 and fuel injector rail 22. Electric resistance heater 40 and temperature sensor 42 are located within reservoir tank 50 of reservoir 30 and they are designed to maintain a specified temperature of phase change material 32 using battery power. Another option would include activating electric resistance heater 40 only at the time of starting internal combustion engine 12 when the temperature of phase change material 32 is below a specified temperature. A fluid check valve 62 is disposed between fluid port 56 and fluid pump 34 as illustrated in FIG. 4. Optionally, as illustrated in phantom in FIG. 4, check valve 62 may be located between fluid port 56 and fuel injector rail 22.

Fuel injector rail 22 comprises an outer tube 70 defining a chamber, a fuel inlet 72, an inner tube 74 and a fluid port 76. A second heat transfer medium such as fuel is pumped to outer tube 70 into fuel inlet 72 from the vehicle's fuel pump. The fuel flows over inner tube 74 which is sealed and separate from outer tube 70 to reach fuel injectors 24. As the fuel flows over inner tube 74, the fuel absorbs heat from first heat transfer medium 36 which is being pumped through inner tube 74 as described below.

First heat transfer medium 36 is preferably a light weight oil. When vehicle 10 has internal combustion engine 12 running, heat is transferred into first heat transfer medium 36 from the fuel which is being pumped through fuel inlet 72 and into outer tube 70 as first heat transfer medium 36 flows through inner tube 74 and back to fluid port 76. First heat transfer medium 36 is pumped by fluid pump 34 from reservoir 30 through fluid check valve 62, through an inner tube of co-axial feed and return tube 38, and into inner tube 74 through a fluid port 76. First heat transfer medium 36 flows through inner tube 74, into an outer tube of co-axial feed and return tube 38 and back into reservoir 30. First heat transfer medium 36 transfers energy in the form of the heat to phase change material 32 located within reservoir tank 50 of reservoir 30. Once a specified temperature of phase change material 32 is reached, fluid pump 34 may be deactivated.

When internal combustion engine 12 is stopped, phase change material 32 and first heat transfer medium 36 will retain the heat for a specified period of time. When engine 12 is restarted, fluid pump 34 will again be activated to pump first heat transfer medium 36 back through inner tube 74 of fuel injector rail 22 to warm the fuel being pumped through fuel injector rail 22 to fuel injectors 24 using the heat stored in heat transfer medium 30 and phase change material 32. Because the combustion of the fuel is only a problem at low ambient temperatures, hot fluid temperature conditioner 26 only needs to be activated to heat the fuel when the ambient temperature is below a specified temperature. Once engine 12 has warmed to its normal operating temperature, hot fluid temperature conditioner 26 will again be activated to maintain the temperature of phase change material 32 and first heat transfer medium 36. Electric resistance heater 40 can be activated as described above if phase change material 32 is below a specified temperature due to an extended non-operating condition of internal combustion engine 12.

Referring now to FIG. 5, a hot fluid temperature conditioner 126 is illustrated in greater detail. Hot fluid temperature conditioner 126 comprises a reservoir 130, a phase change material 132, a fluid pump 134, a first heat transfer medium 136, a feed tube 138, a return tube 140, an electric resistance heater 142 and a temperature sensor 144.

Reservoir 130 comprises a reservoir tank 150 and a cover 152. Reservoir tank 150 is a metal or plastic tank having insulated walls. Reservoir tank 150 includes an electric terminal 154 for providing power to fluid pump 134 and electric resistance heater 142 and a fluid port 156 which mates with feed tube 138 and return tube 140. Phase change material 132, fluid pump 134 and first heat transfer medium 136 are disposed within reservoir tank 150 of reservoir 130. Feed tube 138 and return tube 140 extend between reservoir tank 150 of reservoir 130 and fuel injector rail 22. Electric resistance heater 142 and temperature sensor 144 extend into reservoir tank 150 of reservoir 130 and they are designed to maintain a specified temperature of phase change material 132 using battery power. Another option would include activating electric resistance heater 142 only at the time of starting internal combustion engine 12 when the temperature of phase change material 132 is below a specified temperature. A thermal circuit cutoff switch 160 is disposed between electric terminal 154 and fluid pump 134 and a fluid check valve 162 is disposed between fluid port 156 and fluid pump 134 as illustrated in FIG. 5.

Fuel injector rail 22 comprises outer tube 70, fuel inlet 72, inner tube 74 and fluid port 76. Fuel is pumped to outer tube 70 through fuel inlet 72 from the vehicle's fuel pump. The fuel flows over inner tube 74 which is sealed and separate from outer tube 70 to reach fuel injectors 24. As the fuel flows over inner tube 74, the fuel absorbs heat from first heat transfer medium 136 which is being pumped to inner tube 74 as described below.

First heat transfer medium 136 is preferably a light weight oil. When vehicle 10 has internal combustion engine 12 running, heat is transferred into first heat transfer medium 136 from the fuel which is being pumped through fuel inlet 72 and into outer tube 70 as it flows through inner tube 74. First heat transfer medium 136 is dumped by fluid pump 134 from reservoir 130 through fluid check valve 162, through feed tube 138, and into inner tube 74 through fluid port 76. First heat transfer medium 136 flows through inner tube 74, into return tube 140 and back into reservoir 130. First heat transfer medium 136 transfers the heat to phase change material 132 located within reservoir tank 150 of reservoir 130. Once a specified temperature of phase change material 132 is reached, fluid pump 134 may be deactivated.

When internal combustion engine 12 is stopped, phase change material 132 and first heat transfer medium 136 will retain the heat for a specified period of time. When engine 12 is restarted, fluid pump 134 will again be activated to pump first heat transfer medium 136 back through inner tube 74 of fuel injector rail 22 to warm the fuel being pumped through fuel injector rail 22 to fuel injectors 24 using the heat stored in heat transfer medium 30 and phase change material 32. Because the combustion of the fuel is only a problem at low ambient temperatures, hot fluid temperature conditioner 126 only needs to be activated to heat the fuel when the ambient temperature is below a specified temperature. Once engine 12 has warmed to its normal operating temperature, hot fluid temperature conditioner 126 will again be activated to maintain the temperature of phase change material 132 and first heat transfer medium 136. Electric resistance heater 142 can be activated as described above if phase change material 132 is below a specified temperature due to an extended non-operating condition of internal combustion engine 12.

Figure 6:
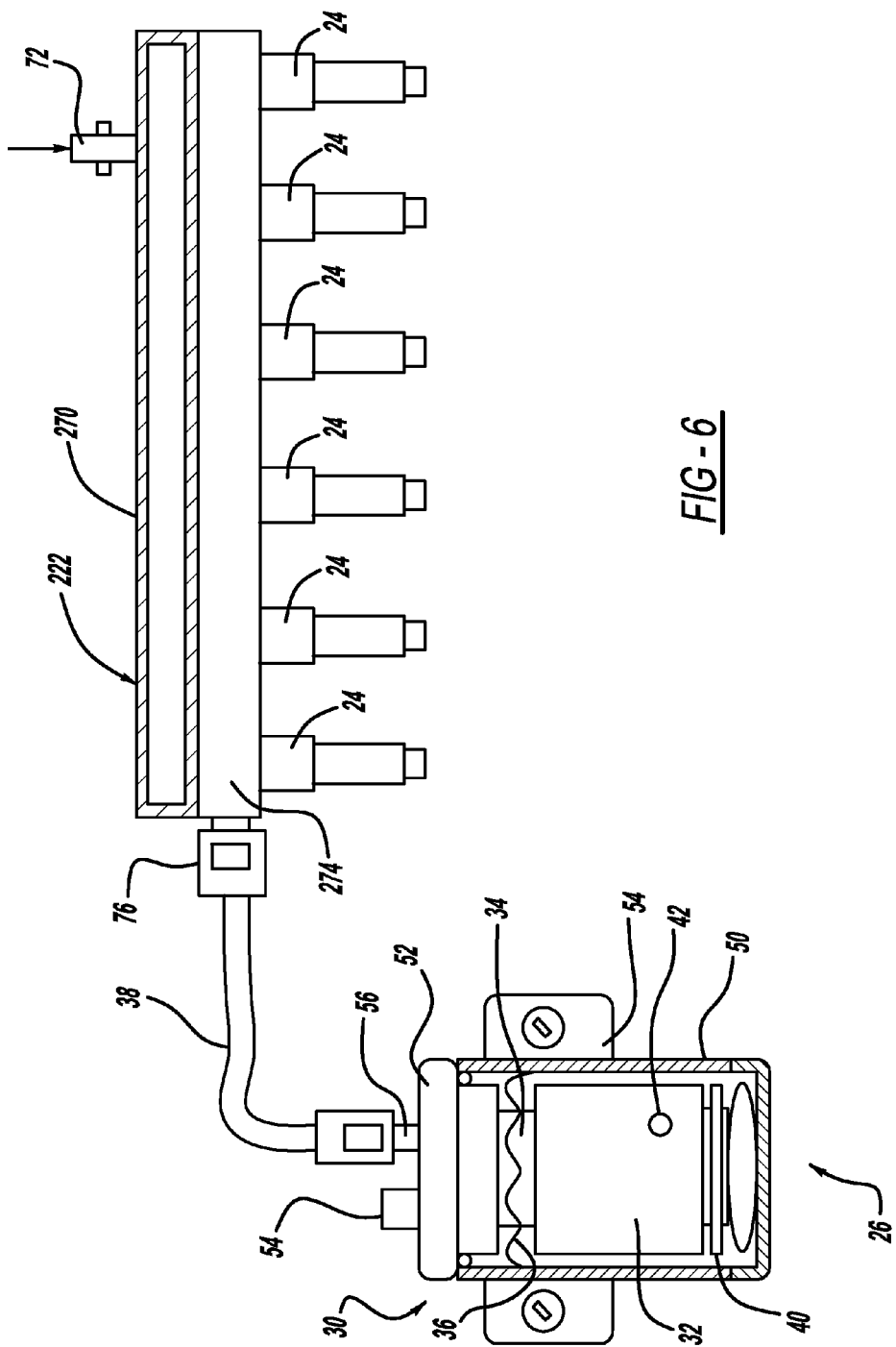
FIG. 6 is a schematic view of a hot oil temperature conditioner in accordance with another embodiment of the present disclosure.

Referring now to FIG. 6, hot fluid temperature conditioner 26 is shown in association with a fuel injection rail 222. Fuel injection rail 222 comprises an outer tube 270 defining a chamber, fuel inlet 72, an outer housing 274 and fluid port 76. A second heat transfer medium such as fuel is pumped to outer tube 270 into fuel inlet 72 from the vehicle's fuel pump. The fuel flows through the chamber defined by outer tube 270 to reach fuel injectors 24.

Housing 274 surrounds each of the fuel injectors and co-axial feed and return tube 38 extends between cover 52 of reservoir 30 and fluid port 76 which is attached to housing 274. Housing 274 defines an inlet passage which transports first heat transfer medium 36 from fluid port 76 to the opposite side of housing 274. First heat transfer medium 36 reverses direction at the opposite side of housing 274 and flows back to fluid port 76 and then back to reservoir 30 through co-axial feed and return tube 38.

First heat transfer medium 36 is preferably a light weight oil. When vehicle 10 has internal combustion engine 12 running, heat is transferred into first heat transfer medium 36 from the fuel which is being pumped through fuel inlet 72, into outer tube 270 and through injectors 24 as first heat transfer medium 36 flows through housing 274. First heat transfer medium transfers energy in the form of heat to phase change material 32 located within reservoir tank 50 of reservoir 30. Once a specified temperature of phase change material 32 is reached, fluid pump 34 may be deactivated.

When internal combustion engine 12 is stopped, phase change material 32 and first heat transfer medium 36 will retain the heat for a specified period of time. When engine 12 is restarted, fluid pump 34 will again be activated to pump first heat transfer medium 36 back through housing 274 to warm the fuel being pumped through fuel injectors 24 using the heat stored in heat transfer medium 30 and phase change material 32. Because the combustion of the fuel is only a problem at low ambient temperatures, hot fluid temperature conditioner 26 only needs to be activated to heat the fuel when the ambient temperature is below a specified temperature. Once engine 12 has warmed to its normal operating temperature, hot fluid temperature conditioner 26 will again be activated to maintain the temperature of phase change material 32 and first heat transfer medium 36. Electric resistance heater 40 can be activated as described above if phase change material 32 is below a specified temperature due to an extended non-operating condition of internal combustion engine 12.

Figure 7:
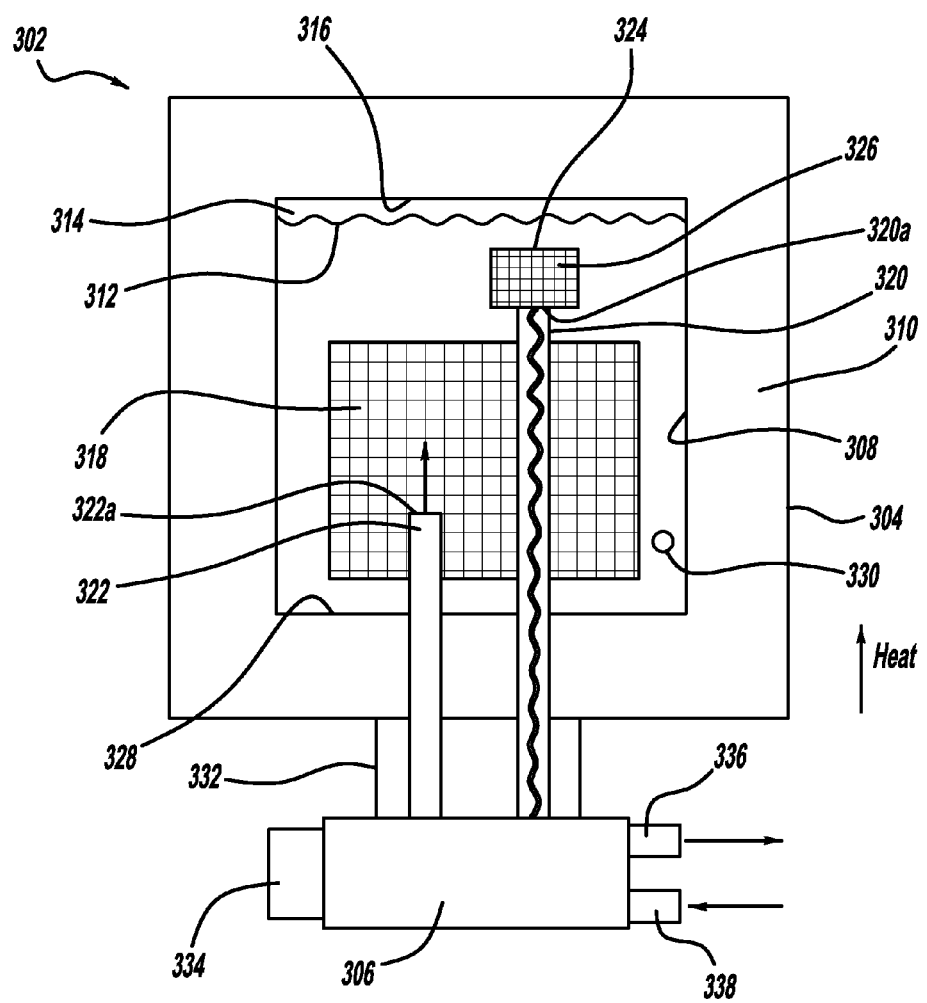
FIG. 7 is a schematic view of another hot oil temperature conditioner in accordance with the present disclosure.

With reference to FIG. 7, another hot fluid temperature conditioner is illustrated at reference numeral 302. The hot fluid temperature conditioner 302 generally includes a reservoir tank 304 and a pump 306. The tank 304 includes an inner chamber 308 therein, which is surrounded by an insulation layer 310. The inner chamber 308 is filled with first heat transfer medium 312. Less than an entirety of the inner chamber 308 is filled with the heat transfer medium 312 to define a thermal expansion zone 314 between an upper surface 316 of the inner chamber 308 and the first heat transfer medium 312. The first heat transfer medium 312 can be any suitable heat transfer medium, such as light weight oil.

Mounted within the inner chamber 308 is a thermal transfer medium in the form of a phase change material 318. Extending between the inner chamber 308 and the pump 306 is an outlet line 320 and an inlet or return line 322. The outlet line 320 includes a ceramic heater 324 and an inlet screen 326 proximate to an opening or orifice 320a thereof, through which the medium 312 enters the outlet line 320. As illustrated, the orifice 320a and the ceramic heater 324 are between the phase change material 318 and the upper surface 316 of the inner chamber 308. The return line 322 includes an opening or orifice 322a at a lower end of the phase change material 318 proximate to a lower surface 328 of the inner chamber 308. The inner chamber 308 further includes a temperature sensor 330 to monitor the temperature of the first heat transfer medium 312.

The pump 306 is connected to the reservoir tank 304 with a neck 332. The pump 306 can be connected to the neck 332 in any suitable manner, such as with a screw connection. The pump 306 can be an electrical pump including an electrical connector 334. The pump 306 includes an outlet 336 and an inlet 338. The outlet 336 is in fluid communication with the outlet line 320 and the inlet 338 is in fluid communication with the return line 322. The outlet 336 and the inlet 338 can be connected to the fuel injector rail 22 or the fuel injector rail 222 with the feed and return tube 38.

By arranging the pump 306 outside of the inner chamber 308 and spaced apart from the reservoir tank 304, the pump 306 is protected from the heat of the inner chamber 308. To more effectively heat the first heat transfer medium 312, the ceramic heater 324 is placed inside of the inner chamber 308 on the outlet line 320 proximate to the orifice 320a. Because the outlet line 320 is arranged such that the orifice 320a is proximate to the heater 324 and to the upper surface 316, where the medium 312 is warmest due to heat rising through the medium 312, the medium 312 entering the orifice 320a will be warmer than, for example, medium proximate to the lower surface 328. By arranging the return line 322 proximate to the lower surface 328, returning first heat transfer medium 312 passes across an entire length of the phase change material 318 to more effectively reheat the medium 312.

The hot fluid temperature conditioner 302 operates to pump the first heat transfer medium 312 to and from the fuel injector rail 22 or the fuel injector rail 222 in substantially the same way as described above with respect to the hot fluid temperature conditioners 26 and 126. The hot fluid temperature conditioner 302 can be configured to pump the first heat transfer medium 312 to any vehicle component in need of heat, in addition to or in place of the fuel injector rail 22. For example, the hot fluid temperature conditioner 302 can be configured to pump the first heat transfer medium 312 to a urea tank of a diesel engine, or to a block heater.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fluid temperature conditioner comprising:
a reservoir tank defining an inner chamber including an upper surface and a lower surface;
a pump mounted to an exterior surface of the reservoir tank;
a phase change material within the inner chamber;
a heat transfer medium within the inner chamber;
an outlet line extending between the inner chamber and the pump, the outlet line including an outlet line orifice between the phase change material and the upper surface;

a heater proximate to the outlet line orifice; and a return line extending between the inner chamber and the pump, the return line including a return line orifice proximate to a portion of the phase change material proximate to the lower surface of the inner chamber;

wherein the pump is configured to pump the heat transfer medium to and from a vehicle component to be heated.

2. The fluid temperature conditioner of claim 1, wherein:

the pump is configured to pump the heat transfer medium to and from a fuel injector rail through a feed and return tube, an inner tube extends across a length of the fuel injector rail; and the feed and return tube connects the pump to the inner tube to pump the heat transfer medium to and from the inner tube, heat transfer occurs between fuel present in the fuel injector rail and the heat transfer medium present in the inner tube.

3. The fluid temperature conditioner of claim 1, further comprising an inlet screen at the outlet line orifice and a temperature sensor in the inner chamber.

4. The fluid temperature conditioner of claim 1, wherein the vehicle component to be heated is at least one of fuel or urea.

5. The fluid temperature conditioner of claim 1, wherein the heat transfer medium includes oil.

* * * * *